(12) United States Patent
Rabinovich et al.

(10) Patent No.: US 9,834,442 B2
(45) Date of Patent: Dec. 5, 2017

(54) GLIDING ARC PLASMATRON REACTOR WITH REVERSE VORTEX FOR THE CONVERSION OF HYDROCARBON FUEL INTO SYNTHESIS GAS

(75) Inventors: Alexander Rabinovich, Cherry Hill, NJ (US); Michael Gallagher, Philadelphia, PA (US); Alexander Fridman, Philadelphia, PA (US); Anatoliy Polevich, Philadelphia, PA (US); Alexander F. Gutsol, San Ramon, CA (US)

(73) Assignee: Drexel University, Philadelphia, PA (US)

( * ) Notice: Subject to any disclaimer, the term of this patent is extended or adjusted under 35 U.S.C. 154(b) by 1099 days.

(21) Appl. No.: 13/637,168

(22) PCT Filed: Feb. 18, 2011

(86) PCT No.: PCT/US2011/025386
§ 371 (c)(1),
(2), (4) Date: Oct. 3, 2013

(87) PCT Pub. No.: WO2011/119274
PCT Pub. Date: Sep. 29, 2011

(65) Prior Publication Data
US 2016/0194202 A1 Jul. 7, 2016

Related U.S. Application Data

(60) Provisional application No. 61/317,530, filed on Mar. 25, 2010.

(51) Int. Cl.
*C01B 3/36* (2006.01)
*C10J 3/72* (2006.01)
(Continued)

(52) U.S. Cl.
CPC .............. *C01B 3/363* (2013.01); *B01J 19/088* (2013.01); *C01B 3/342* (2013.01); *C10J 3/487* (2013.01);
(Continued)

(58) Field of Classification Search
CPC . C01B 3/363; C01B 3/342; C01B 2203/1247; C01B 2203/142;
(Continued)

(56) References Cited

U.S. PATENT DOCUMENTS

| | | |
|---|---|---|
| 3,042,830 A | 7/1962 | Orbach |
| 3,344,051 A | 9/1967 | Latham |

(Continued)

FOREIGN PATENT DOCUMENTS

| | | |
|---|---|---|
| WO | WO 2004/112950 A2 | 12/2004 |
| WO | WO 2005/004556 A2 | 1/2005 |

(Continued)

OTHER PUBLICATIONS

U.S. Appl. No. 60/480,132, filed Jun. 20, 2003, Gutsol, et al.
(Continued)

*Primary Examiner* — Anthony J Zimmer
*Assistant Examiner* — Syed Iqbal
(74) *Attorney, Agent, or Firm* — Baker & Hostetler LLP

(57) ABSTRACT

A reactor for reforming a liquid hydrocarbon fuel, and associated processes and systems, are described herein. In one example, a two stage process is disclosed in which a first reactor is coupled to a second stage reactor having a reaction volume greater than the first reactor. In the first reactor, the liquid hydrocarbon fuel is partially reformed and thereafter is inputted into the second stage reactor for complete partial oxidation. The reaction product is at last partially synthesis gas, a mixture of carbon monoxide, hydrogen, as well as other low hydrocarbons such as methane, ethylene, ethane, (Continued)

and acetylene. The low hydrocarbons can be reformed further in a solid oxide fuel cell. A portion of the gaseous, rotating contents of the second stage reactor may be input into the first reactor to help generate and sustain rotation within the first reactor.

14 Claims, 6 Drawing Sheets

(51) Int. Cl.
*C10J 3/48* (2006.01)
*B01J 19/08* (2006.01)
*C01B 3/34* (2006.01)
*H05H 1/48* (2006.01)

(52) U.S. Cl.
CPC ............... *C10J 3/721* (2013.01); *H05H 1/48* (2013.01); *B01J 2219/0809* (2013.01); *B01J 2219/0847* (2013.01); *B01J 2219/0869* (2013.01); *B01J 2219/0877* (2013.01); *B01J 2219/0884* (2013.01); *B01J 2219/0894* (2013.01); *C01B 2203/025* (2013.01); *C01B 2203/0244* (2013.01); *C01B 2203/0255* (2013.01); *C01B 2203/0861* (2013.01); *C01B 2203/1235* (2013.01); *C01B 2203/1241* (2013.01); *C01B 2203/1247* (2013.01); *C01B 2203/141* (2013.01); *C01B 2203/142* (2013.01); *C10J 2300/0916* (2013.01); *C10J 2300/0956* (2013.01); *C10J 2300/1238* (2013.01); *Y02P 20/145* (2015.11)

(58) Field of Classification Search
CPC .... C01B 2203/1241; C01B 2203/0255; C01B 2203/0861; C01B 2203/141; C01B 2203/1235; C01B 2203/0244; C01B 2203/025; C10J 3/487; C10J 2300/0916; C10J 2300/0956; C10J 2300/1238; B01J 19/088; B01J 2219/0809; B01J 2219/0869; B01J 2219/0884; B01J 2219/0847; B01J 2219/0877; H05H 1/48; Y02P 20/145

See application file for complete search history.

(56) References Cited

U.S. PATENT DOCUMENTS

| | | |
|---|---|---|
| 3,903,891 A | 9/1975 | Brayshaw |
| 4,217,132 A | 8/1980 | Burge et al. |
| 4,271,132 A | 6/1981 | Eickmeyer |
| 4,690,743 A | 9/1987 | Ethington et al. |
| 4,801,435 A | 1/1989 | Tylko |
| 4,851,722 A | 7/1989 | Zauderer |
| 4,927,298 A | 5/1990 | Tuszko et al. |
| 4,995,231 A | 2/1991 | Smith et al. |
| 4,995,805 A | 2/1991 | Hilliard |
| 5,116,488 A | 5/1992 | Torregrossa |
| 5,211,923 A | 5/1993 | Harkness et al. |
| 5,348,587 A | 9/1994 | Eichman et al. |
| 5,374,802 A | 12/1994 | Dorfman et al. |
| 5,425,332 A | 6/1995 | Rabinovich et al. |
| 5,437,250 A | 8/1995 | Rabinovich et al. |
| 5,486,269 A | 1/1996 | Nilsson |
| 5,843,395 A | 12/1998 | Wang |
| 5,847,353 A | 12/1998 | Titus et al. |
| 5,887,554 A | 3/1999 | Cohn et al. |
| 5,948,704 A | 9/1999 | Benjamin et al. |
| 5,993,761 A | 11/1999 | Czernichowski et al. |
| 6,007,742 A | 12/1999 | Czernichowski et al. |
| 6,245,309 B1 | 6/2001 | Etievant et al. |
| 6,322,757 B1 | 11/2001 | Cohn et al. |
| 6,363,716 B1 | 4/2002 | Balko et al. |
| 6,396,213 B1 | 5/2002 | Koloc |
| 6,416,508 B1 | 7/2002 | Eggers et al. |
| 6,629,974 B2 | 10/2003 | Penny et al. |
| 6,793,898 B2 | 9/2004 | Brown et al. |
| 7,569,203 B2 | 8/2009 | Fridman et al. |
| 7,622,693 B2 | 11/2009 | Foret |
| 7,867,457 B2 | 1/2011 | Gutsol et al. |
| 2002/0023538 A1 | 2/2002 | Agarwal et al. |
| 2003/0024806 A1* | 2/2003 | Foret .................... B01J 19/126 204/164 |
| 2005/0191237 A1 | 9/2005 | Selinger et al. |
| 2006/0018823 A1 | 1/2006 | Czernichowski et al. |
| 2006/0266637 A1 | 11/2006 | Gutsol et al. |
| 2007/0186474 A1 | 8/2007 | Rabovister et al. |
| 2007/0196249 A1 | 8/2007 | Fridman et al. |
| 2007/0259228 A1* | 11/2007 | Hartvigsen ............ C01B 3/342 429/422 |
| 2009/0056222 A1* | 3/2009 | Gutsol ....................... C10J 3/18 48/65 |
| 2009/0060805 A1 | 3/2009 | Muradov et al. |
| 2009/0305091 A1 | 12/2009 | Fridman et al. |
| 2011/0044884 A1 | 2/2011 | Gutsol et al. |

FOREIGN PATENT DOCUMENTS

| | | |
|---|---|---|
| WO | WO 2006/116252 | 11/2006 |
| WO | WO 2008/137936 A1 | 11/2008 |
| WO | WO 2011/119274 | 9/2011 |

OTHER PUBLICATIONS

U.S. Appl. No. 60/480,341, filed Jun. 20, 2003, Fridman, et al.
U.S. Appl. No. 60/551,725, filed Mar. 10, 2004, Fridman, et al.
U.S. Appl. No. 60/775,176, filed Feb. 21, 2006, Fridman, et al.
Forest Product Fact Sheet, "Low Temperature Plasma Technologies for Treating Emissions from Pulp Mills and Wood Products", Office of Industrial Technologies, Alexander Fridman and John Harkness, Feb. 2001, 2 pgs.
Kalra, C.S., et al., "Gliding Arc Discharges as a Source of Intermediate Plasma for Methane Partial Oxidation", IEEE Transactions of Plasma Science, Feb. 2005, vol. 33, No. 1, 32-41.
Kalra, et al., "Gliding Arcln Tornado Using a Reverse Vortex Flow", Review of Scientific Instruments, Jan. 21, 2005, vol. 76, 7 pgs.
PCT Application No. PCT/US2008/062915 : International Preliminary Report on Patentability of the International Searching Authority, dated Nov. 10, 2009, 8 pages.
PCT Application No. PCT/US2008/062915: International Search Report and Written Opinion of the International Searching Authority, dated Jul. 22, 2008, 8 pages.

* cited by examiner

GLIDING ARC PLASMATRON REACTOR WITH REVERSE VORTEX FOR THE CONVERSION OF HYDROCARBON FUEL INTO SYNTHESIS GAS

CROSS-REFERENCE TO RELATED APPLICATIONS

This application is the National Stage of International Application No. PCT/US2011/025386, filed Feb. 18, 2011, which claims the benefit of U.S. Provisional Application No. 61/317,530, filed Mar. 25, 2010, the disclosures of which are incorporated herein by reference in their entirety.

GOVERNMENT RIGHTS

This invention was made with government support under contract W56HZV-07-C-0577 awarded by the United States Army. The government has certain rights in this invention.

FIELD OF THE INVENTION

The invention is in the field of the chemical conversion of materials using plasma.

BACKGROUND OF THE INVENTION

Synthesis gas is a gaseous mixture that contains various amounts of carbon monoxide and hydrogen. Synthesis gas, or syngas, is typically generated by the gasification of a carbon containing fuel into a gaseous product. There may be several uses for syngas, including the production of energy through combustion of the syngas as well as using the syngas as an intermediate for the production of chemicals such as synthetic petroleum.

Current methods of production of syngas may include partial oxidation, steam reforming, "dry" reforming with CO2, and autothermal reforming. These and other processes reform the hydrocarbon to produce syngas. However, current methods of syngas production from low quality hydrocarbons (e.g. bio-mass) typically require relatively large amounts of energy input to maintain the process at a steady state. Low quality hydrocarbons are those that have a relatively low heat calorific value. Thus, the energy released by the partial oxidation typically is insufficient to support the process. Further, a significant portion of the energy that is produced is typically lost because of design limitations. Partial oxidation of high quality hydrocarbons, e.g. liquid fuels, is also a process that difficult to control and typically results in soot formation in high temperature flame zones.

There is a need for an improved way to efficiently reform hydrocarbon fuel into syngas.

SUMMARY OF THE INVENTION

In some embodiments, the invention concerns the use of a two stage process that uses non-equilibrium or non-thermal plasma to convert liquid, gaseous or solid hydrocarbon fuel into syngas. Without being bound by any theory of operation, it is believed that the plasma acts as a catalyst, which may reduce the energy input required to stimulate the process.

In some embodiments, the invention concerns a two stage process using non-equilibrium plasma as a catalyst to oxidize hydrocarbons. In a first stage, a first reactor is used having a reaction volume optimized to partially oxidize at least a portion of the incoming fuel. In some embodiments, the first reactor may be a plasmatron device. The partially oxidized fuel is then inputted into a second reactor having a larger reaction volume. The fuel is oxidized to create syngas. In some embodiments, the overall oxygen to carbon (O/C) ratio from both reactors is about 1. In still further embodiments, the ratio in the smaller first reactor may be less than 1 while the ratio in the second reactor may be more than 1. Products of the second partial oxidation stage may comprise synthesis gas—$H_2$ and CO (with $N_2$ admixture in the case of air use for partial oxidation), and remaining light hydrocarbons such as methane ($CH_4$), acetylene ($C_2H_2$), ethylene ($C_2H_4$), and ethane ($C_2H_6$).

In some embodiments, the input stream may be comprised of various components, including gasoline, diesel, natural gas, biomass and jet propellant such as JP5 or JP8 fuel. In some embodiments, the input stream may also be comprised of an oxidizing gas such as air, oxygen or a mixture of gases having oxygen and steam, and/or carbon dioxide In one exemplary and non-limiting example of the present subject matter, a process is disclosed for reforming liquid hydrocarbon fuel. In first stage reactor, liquid hydrocarbon fuel and an oxidizing gas is inputted and partially reformed using non-thermal plasma. The partially reformed fuel is inputted into a second reactor with additional oxidizing gas and is reformed into synthesis gas. In one example, the second reactor flow pattern may be characterized as a reverse vortex flow pattern. In another example, the first reactor may also have a flow pattern that is characterized as a reverse vortex flow pattern.

In another embodiment, the remaining light hydrocarbons such as methane ($CH_4$), acetylene ($C_2H_2$), ethylene ($C_2H_4$), and ethane ($C_2H_6$) may be further reformed in a solid oxide fuel cell to produce additional synthesis gas.

These and other features of the subject matter are described below.

BRIEF DESCRIPTION OF THE DRAWINGS

The foregoing summary, as well as the following detailed description of the subject matter is better understood when read in conjunction with the appended drawings. For the purposes of illustration, there are shown in the drawings exemplary embodiments; however, these embodiments are not limited to the specific methods and instrumentalities disclosed. In the drawings.

DETAILED DESCRIPTION OF ILLUSTRATIVE EMBODIMENTS

Figure 1:
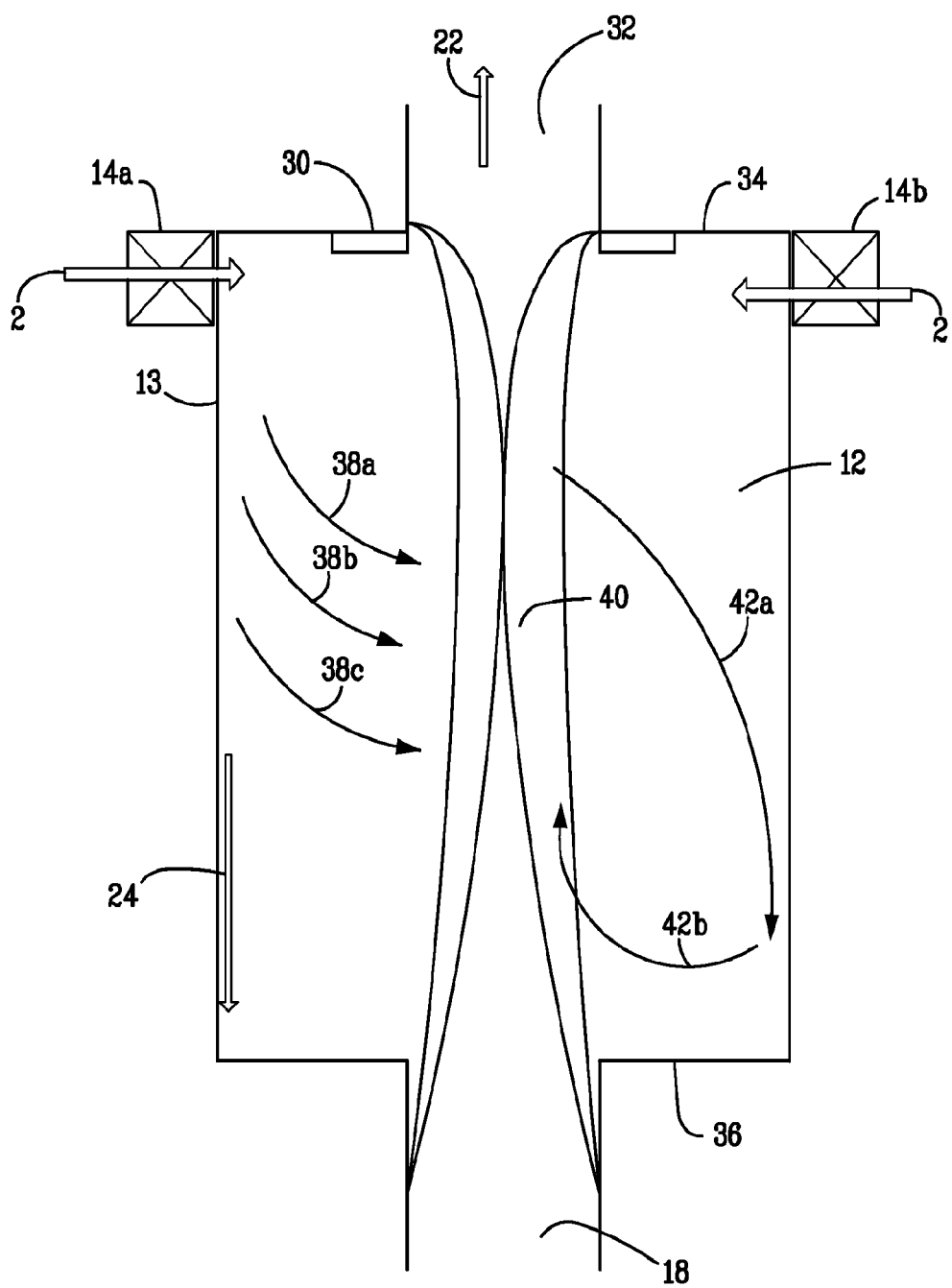
FIG. 1 is an exemplary illustration of a cyclonic reactor illustrating a reverse vortex flow.

Certain specific details are set forth in the following description and figures to provide a thorough understanding of various embodiments of the subject matter. Certain wellknown details often associated with computing and software technology are not set forth in the following disclosure to avoid unnecessarily obscuring the various embodiments of the subject matter. Further, those of ordinary skill in the relevant art will understand that they can practice other embodiments of the subject matter without one or more of the details described below. Finally, while various methods are described with reference to steps and sequences in the following disclosure, the description as such is for providing a clear implementation of embodiments of the subject matter, and the steps and sequences of steps should not be taken as required to practice this subject matter.

A reactor configured to reform liquid, gaseous or solid hydrocarbon fuel and a process is provided for the production of synthesis gas. The reactor is configured to stimulate the process of partial oxidation or autothermal reforming through a plasma. In one configuration, a non-equilibrium or non-thermal plasma is used.

Partial oxidation process has two primary stages: an exothermic stage of combustion and a slow endothermic stage of interaction of $CO_2$ and $H_2O$ with gaseous hydrocarbons. The reaction rate of the first stage may vary depending upon the state of the reacting hydrocarbon. Thus, the residence time of the reactants in the reactor may be varied to maintain a consistent degree of conversion. On the second stage to increase $H_2$ production the steam could be introduced. Partial oxidation and steam reforming reactions could be balanced to provide overall energy neutrality while also taking into account heat losses.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, references to values stated in ranges include each and every value within that range.

The term "gliding arc" is used in the present subject matter as is understood by those skilled in the art. It should be understood that a plasma discharge in the present subject matter may be generated in various ways, for example, glow discharge. In a reactor implementing a glow discharge, a cathode current may be controlled mostly by the secondary electron emission, as occurs in glow discharge, instead of thermionic emission, as occurs in electrical arcs.

In the present disclosed subject matter, a gliding arc discharge plasma may be used in two reactors to cause the partial oxidation of a hydrocarbon. For example, the first stage, or first reactor, may be used to evaporate some or all of the liquid fuel using a plasma and plasma supported flame while the chemical process of oxidation (or ignition) of the evaporated liquid may be initiated in the second reactor. A gliding arc discharge reactor is configured to cause a high-voltage electrical discharge to glide over the surface of one or more electrodes. The properties of the plasma discharge may be adjusted depending upon the configuration of the reactor. The reactor of the present example may be further configured to utilize a reverse-vortex flow pattern. Reverse vortex flow means that the vortex flow has axial motion initially from a swirl generator to a "closed" end of reaction chamber.

Referring now to the drawings, wherein like reference numerals designate corresponding structure throughout the views, and referring in particular to FIG. 1, a schematic view of an exemplary reactor configured to provide reverse vortex flow, reactor 10, is illustrated. It should be noted that the shape and size of reactor 10 may vary. For example, reactor 10 may be generally conical or cylindrical in shape. Reactor 10 includes reaction chamber 12. At or near top 34 of reactor 10, there is a swirl generator, one or more nozzles 14a, 14b, that cause rotation of the fluids in reaction chamber 12. Rotation of the fluids in reaction chamber 12 may be caused by various ways.

In the present embodiment, nozzles 14a and 14b may be tangential nozzles that introduce input fluid 2 into reaction chamber 12 tangentially. This present embodiment is for illustrative purposes only, as the rotation may be caused by other means, such as baffles inside of reaction chamber 12. Further, in some embodiments, input fluid 2 may be introduced into reaction chamber 12 at or near sonic velocity having mostly the tangential component of the velocity vector. Input fluid 2, in the present example, may be an input fluid comprising solid hydrocarbons.

Figure 2:
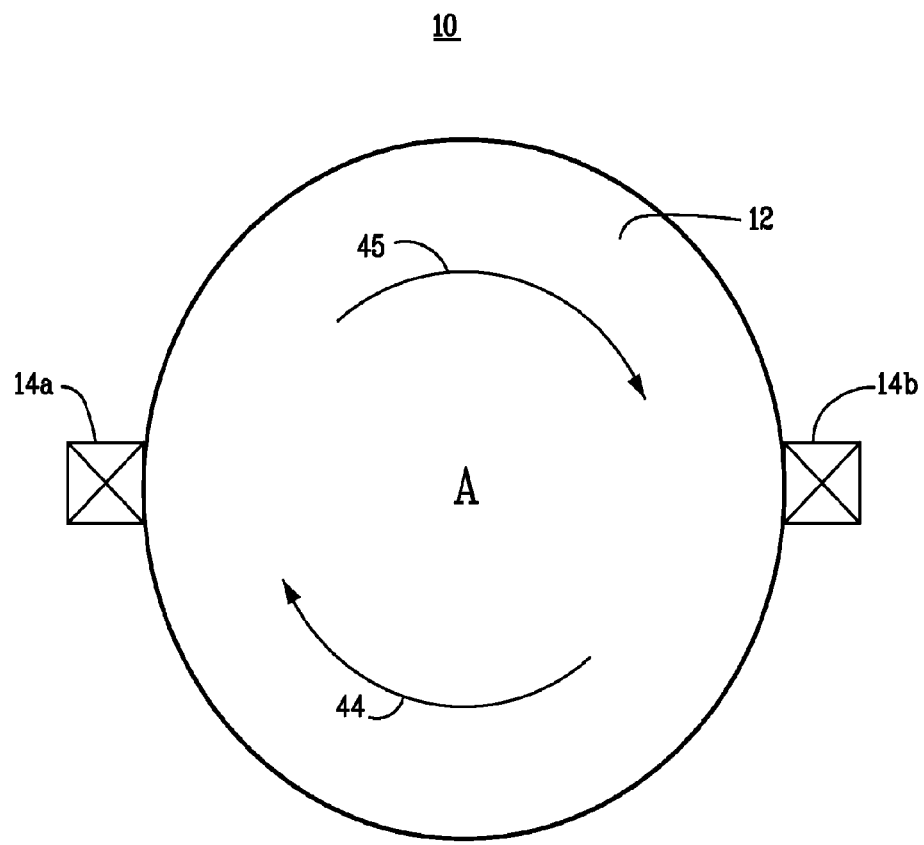
FIG. 2 is an exemplary illustration of a cyclonic reactor illustrating a vortex flow as seen from the top to the bottom of the reactor.

FIG. 2 further illustrates the rotation of the fluids inside reaction chamber 12. Reactor 10 reaction chamber 12 has axis "A" that extends from the top (not shown), such as top 34 of reactor 10 to the bottom (not shown), such as bottom 36, of reactor 10. In the present embodiment, a rotational flow is generated by nozzles 14a and 14b introducing input fluid (not shown) into reaction chamber 12 tangential to axis "A". A general flow pattern is caused whereby the fluids in the reactor rotate about axis "A", shown by exemplary fluid flows 44 and 45.

It should also be understood that, although the reactor 10 of FIG. 1 is shown as having top 34 and bottom 36, reactor 10 may be arbitrarily oriented in space, and the significance of the spatial orientation of top 34 and bottom 36 are merely to provide reference points to illustrate the exemplary embodiment of reactor 10.

In one embodiment, input fluid 2 may be an input stream of air or other gas and hydrocarbons. It should be understood that input fluid 2 may also have substances or compounds other than air and hydrocarbons. The present subject matter is not limited to input fluid 2 being a pure fluid input, but rather, discusses the partial oxidation of the hydrocarbon component of input fluid 2.

Referring back to FIG. 1, nozzles 14a, 14b that help to generate a rotation of the fluids in reactor 10 may be located about a circumference of vortex reactor 10 and are preferably spaced evenly about the circumference. Although two nozzles, 14a, 14b, are illustrated in FIG. 1, it should be understood that this configuration is an exemplary configuration and that reactor 10 may have one nozzle or more than two nozzles, depending upon the configuration. In other embodiments, additional nozzles, not shown, may be placed in various locations on reactor 10. Additionally, it should be understood that one or more nozzles may be used to introduce one or more input fluids into reaction chamber 12.

In the present embodiment, reactor 10 has input fluid 2 and two output streams, output stream 22 and output stream 24. Output stream 22 is preferably stream comprising synthesis gas, i.e. hydrogen and carbon monoxide, as well as other gases such as nitrogen if air is input into the reactor. Depending upon the reactions within reactor 10, output stream 24 may be composed of solid reaction products such as ash. It should be understood that output streams 22 and 24 may not be pure but may contain other compounds because of impurities in input fluid 2 or incomplete oxidation and/or separation of the solid reaction products from the gaseous reaction products in the chamber. For example, in output stream 22, ash may be present that may require the installation of one or more filters further downstream.

Input fluid 2 is introduced to reaction chamber 12 via nozzles 14*a*, 14*b*, the outputs of which are preferably oriented tangential relative to wall 13 of reaction chamber 12, as shown by FIG. 2, which is a topside illustration of reactor 10. As shown in FIG. 2, reactor 10 has nozzles 14*a* and 14*b*. Input fluid 2 exits nozzles 14*a* and 14*b* and enters reaction chamber 12 in a generally tangential direction about an axis, such as axis "A" as illustrated in FIG. 2.

By introducing input fluid 2 in this manner, as discussed above, a rotational force is imparted upon the fluids in reaction chamber 12, thus causing a rotation of the fluids in reaction chamber 12 in a clockwise direction in this embodiment. Thus, the velocity at which input fluid 2 enters reaction chamber 12 effects the rotational speed of the contents in reaction chamber 12. It should be noted that the input direction may be in a direction reverse to that shown in FIG. 2. Further, it should be understood that one or more nozzles may be configured to introduce the input fluid in a direction dissimilar to other nozzles.

Referring back to FIG. 1, in an embodiment of the present subject matter, flange 30 and circular opening 32, located substantially at the center of flange 30, assist to form a vortex flow. In the present embodiment, the vortex flow is a reverse vortex flow, though it should be understood that the vortex flow may be a forward vortex flow.

Figure 3:
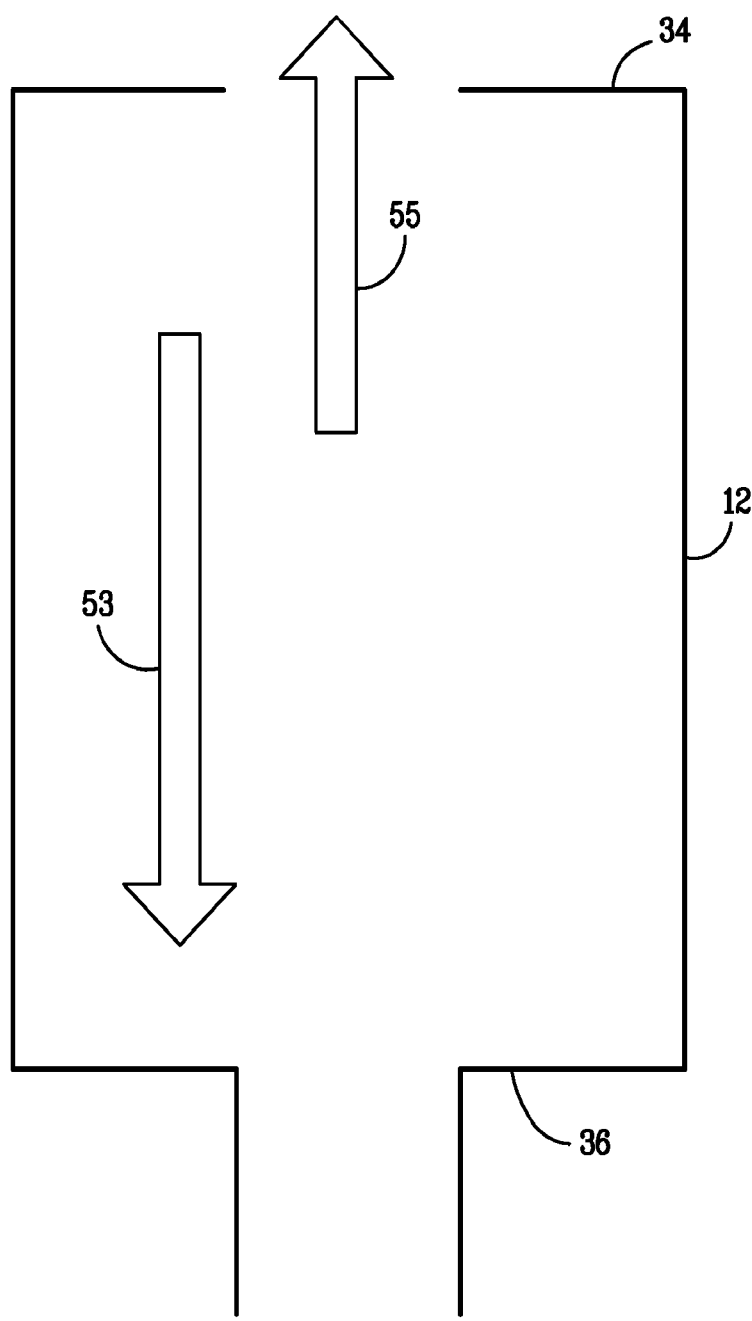
FIG. 3 is an exemplary illustration showing a reverse vortex flow.

FIG. 3 is provided to illustrate a flow pattern which in combination with the rotational flow patterns discussed above and below, create a reverse vortex flow pattern. Reactor 10 has top 34 and bottom 36. Reaction chamber 12 has two general flow patterns, exemplary flow 53 and exemplary flow 55. Generally in reactor 10, components flow in a motion from top 34 to bottom 36 outside near the outer wall of reactor 10 and in an upward motion from bottom 36 to top 34 near the center of reactor 10, as shown in FIG. 3. It should be understood that other flow patterns may be used. It should be understood that reactor 10 may also be arbitrary oriented in space so that top 34 is below bottom 36, as the designations are for illustrative purposes only and are not intended to limit reactor 10 to any particular orientation.

Referring back to FIG. 1, opening 32 in flange 30 is preferably circular, but may be other shapes such as pentagonal or octagonal. The size of circular opening 32 may be varied to configure reactor 10 for various flow patterns in reaction chamber 12. In this present embodiment, for example, the diameter of opening 32 in flange 30 may be from approximately 70% up to 95% of the diameter of reaction chamber 12 to form the reverse vortex flow.

The diameter of opening 32 may also be configured to establish, or prevent, a recirculation zone from forming. Reactor 10 may be configured to provide a way in which relatively hot fluids flowing from plasma region 40 may exchange a portion of their heat with fluids flowing to plasma region 40. For example, exemplary fluids 38*a-c*, which are flowing generally towards plasma region 40 receive heat from exemplary fluid 42*a*, which is flowing from plasma region 40. Exemplary fluid 42*a*, after exchanging heat with exemplary fluids 38*a-c*, may than flow back to plasma region 40, as shown by exemplary fluid 42*b*. Thus, a portion of the reaction heat generated in plasma region 40 and a portion of fluids in reaction chamber 12 recirculate within reactor 10. In one embodiment, if a recirculation zone is desired, the diameter of opening 32 in flange 30 may be approximately 10% up to 75% of the diameter of reaction chamber 12.

As discussed above, reverse vortex flow as used herein means that the vortex flow has axial motion initially caused by nozzles 14*a* and 14*b* along wall 13 of the chamber and then the flow turns back and moves along the axis to the "open" end of the chamber towards opening 32. An example in nature of this flow pattern may be similar to the flow inside a dust separation cyclone. Input fluid 2 travels in a circular motion, traveling in a downward and inward direction towards plasma region 40, as shown by exemplary fluids 38*a-c*.

A reverse vortex flow in reaction chamber 12 causes the contents of reactor 10 in reaction chamber 12 to rotate around plasma region 40, while output stream 22 travels in a direction upwards from the bottom of reactor 10 to opening 32. Along with other benefits that may not be explicitly disclosed herein, the rotation may provide necessary time for the heating of the contents flowing to and in the relatively hot plasma region 40 as the contents move downwardly around plasma region 40. Another benefit of the rotation may be that the reverse vortex flow may increase the residence time of reactants and products inside reaction chamber 12. A still further benefit of the rotation may be that the heat generated as a result of a reaction in plasma region 40 may be insulated from the walls of the reactor, thus reducing the insulating requirements of reactor 10 as well as reducing heat loss, and thus, possibly increasing efficiency.

A vortex flow, such as the reverse-vortex flow described in FIG. 1, may provide for still further several benefits, some of which may not be explicitly described herein. For example, the flow may cause one, or two or more zones inside reaction chamber 12, one being plasma region 40, the other being the remaining volume of reaction chamber 12. For example, in the present subject matter, a temperature differential is established between plasma region 40 to wall 13 of reactor 10. A central axis in plasma region 40 may have the highest temperature in reaction chamber 12, and as the radial distance from that central axis increases to wall 13, the temperature may decrease. Additionally, opening 18 may be used for input of a plasma stream produced in another reactor, as described by way of example in FIG. 4.

Figure 4:
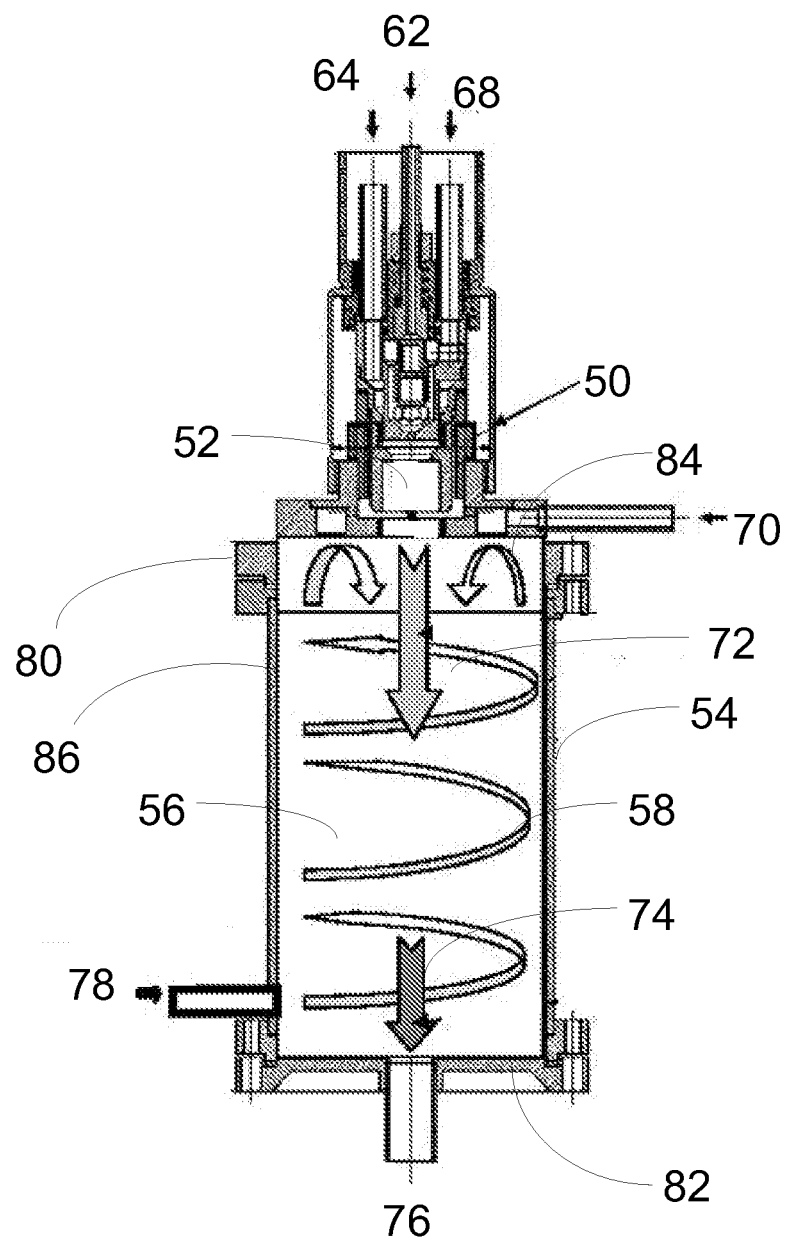
FIG. 4 is an illustration of a two stage process configured to reform hydrocarbon fuel.

FIG. 4 is an illustration of an exemplary system 200 that may be used to reform hydrocarbons. System 100 comprises two reactors, reactor 50 and reactor 54. In one exemplary embodiment, reaction volume 52 of reactor 50 is smaller than reaction volume 56 of reactor 54. An example of a reactor that may be used as reactor 50 is a plasmatron.

Plasmatrons are electrical heating devices that take advantage of the finite conductivity of gases at very elevated temperatures. At these temperatures, the gas is partially ionized. Plasmatrons provide highly controllable electrical heating of this ionized gas. The high temperatures can be used to reform a wide range of hydrocarbon fuels, and particularly heavy hydrocarbons into hydrogen, carbon monoxide and a small amount of methane without the use of a catalyst. One exemplary use of a plasmatron would be to boost the temperature and kinetic actions in a reformer, resulting in hydrogen-rich gas production throughout a wide dynamic range.

The boosting of the conversion process would occur as a result of the creation of a small, very high temperature region (2000-5000 K) where radicals are produced and as a result of increasing the average temperature in an extended region. The additional heating provided by the plasmatron would serve to ensure a sufficiently high number of chemically reactive species, ionization states, and temperatures for the partial oxidation or other reforming reaction to occur with negligible soot production and a high conversion of hydrocarbon fuel into hydrogen rich gas. The effective conversion of JP8 or diesel fuel is aided by both the high peak temperature in the plasma and the high turbulence created by the reverse vortex flow.

In some configurations, plasmatrons may be able provide a number of advantages over conventional reformers. For example, a plasmatron using plasma may be catalyst-free. A plasmatron using plasma may not require any catalysts or water for its operation. That leads to higher reliability, zero maintenance (no parts to replace) and simple low-cost design. A plasmatron using plasma may be insensitive to sulfur or carbon poisoning. A plasmatron using plasma may be fuel-independent. In other words, the same hardware can reform both liquid (such as JP8, diesel, gasoline and biofuel) and various gaseous fuels. Depending upon its size and electrical configuration, a plasmatron using plasma may allow for a faster start-up. For example, some plasmatrons requires less than five seconds to achieve 90% of its output capacity. The first 15% of $H_2$ yield is produced in less than two seconds. It offers quick transient response when needed. A plasmatron using plasma may be capable of "freeze-start" and are typically designed for unlimited "start-stop" cycles.

In FIG. 4, reactor 50 may be a plasmatron. Reactor 50 consists of top electrode, insulator and tubular grounded electrode. In an exemplary configuration, the electrodes are not cooled with water. Reactor 50 has a hydrocarbon fuel input 62 and oxidizing gas inputs 64, 68 and 70. Oxidizing gas inputs 64, 68 and 70 may be air, pure oxygen, or mixtures of gases having oxygen as a component. In some embodiments it is possible instead of liquid fuel 62 introduce gaseous or solid powder (biomass). Inputs 64 and 68 are to be used for liquid fuel atomization and top electrode protection from fuel deposition. Input 70 is to be used to impart a rotating motion of gas and plasma within reaction volume 52 of reactor 50. Additional gas input 78 of reactor 54 is to be used to impart a reverse vortex motion within reactor 54.

Figure 5:
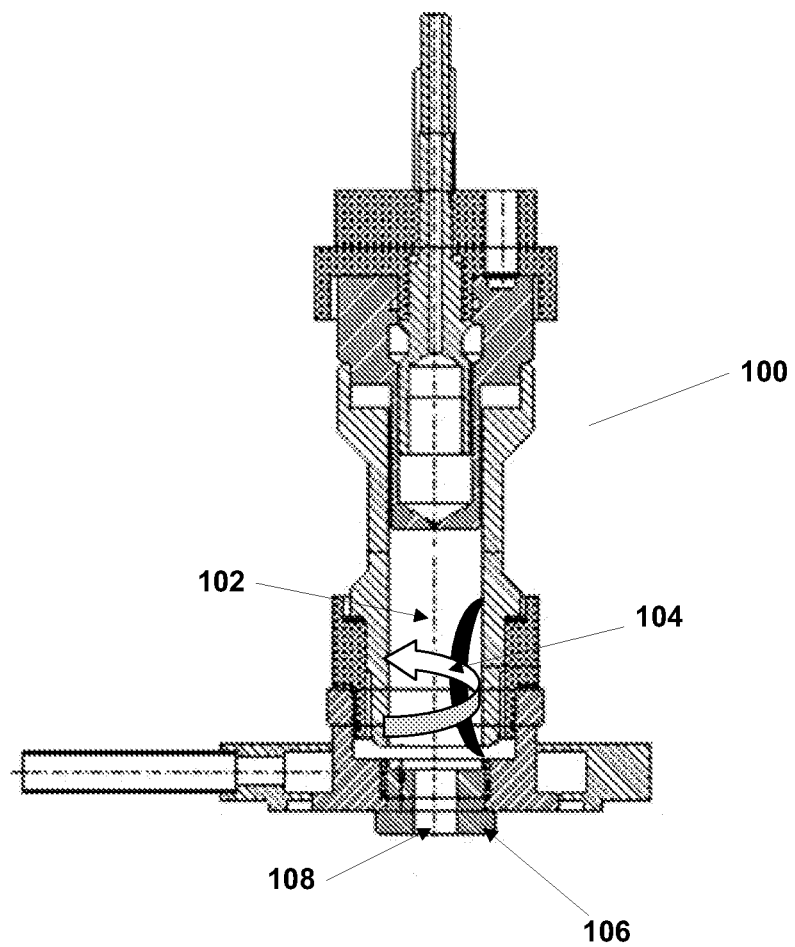
FIG. 5 is an illustration of a plasmatron with reverse vortex flow that may be used as a first stage for the two stage reformation process of hydrocarbon fuel.

FIG. 5 is exemplary plasmatron 100 illustrating reverse vortex flow. Without being bound to any one particular theory, the use of a reverse vortex flow, shown by flow pattern 104, may significantly decrease electrode heat losses and improve mixing of liquid, solid or gaseous fuel in the presence of rotating plasma arc 102. In plasmatron 100, the reverse vortex flow is achieved by including diaphragm 106 at exit 108 of plasmatron 100.

Figure 6:
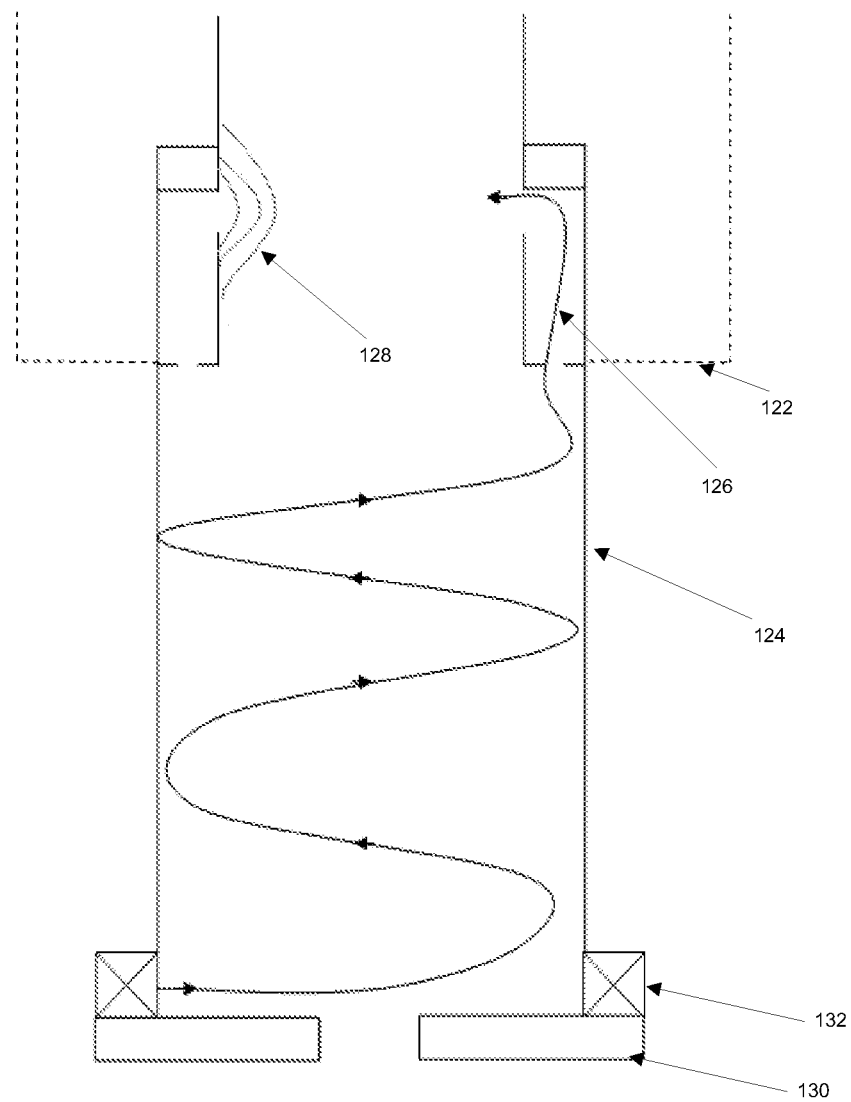
FIG. 6 is an illustration of a two stage process in which reverse vortex air from reactor is used for gliding arc rotation in plasmatron.

FIG. 6 illustrates an exemplary reverse vortex flow system 120 using two plasma reactors. Shown are plasmatron 122 and secondary reactor 124. In some configurations, plasmatron initiates a plasma (not shown) to evaporate an incoming fuel stream (gaseous, liquid or solid) and to initiate oxidation of the fuel. In the configuration shown, a portion of the vortex air 126, whose flow pattern is generated by diaphragm 130 and tangential input 132, from reactor 124 is injected into plasmatron 122 and utilized as swirling air to elongate plasma discharge 128. In some configurations, the advantage of doing so obviates the need for an additional air input (into plasmatron 122) while maintaining an optimal oxygen to carbon ratio near 1. Additionally, the vortex air 126 may allow for heat recuperation.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment but rather should be construed in breadth and scope in accordance with the appended claims.

What is claimed:

1. A process for reforming a hydrocarbon fuel, comprising:
    inputting the hydrocarbon fuel and a first oxidizing gas into a first stage reactor, wherein the relative amounts of the hydrocarbon fuel and the first oxidizing gas provide a first oxygen to carbon (O/C) ratio;
    partially reforming using non-thermal plasma the hydrocarbon fuel into partially reformed hydrocarbon fuel;
    inputting the partially reformed hydrocarbon fuel and a second oxidizing gas into a second stage reactor having a reverse vortex flow, wherein the relative amounts of the partially reformed hydrocarbon fuel and the second oxidizing gas provide a second oxygen to carbon (O/C) ratio, the first O/C ratio being less than 1 and the second O/C ratio being greater than 1, such that the overall ratio of carbon in the hydrocarbon fuel and oxygen in the oxidizing gas is maintained near 1; and
    completing the reforming process of at least a portion of the partially reformed hydrocarbon fuel in the second stage reactor to produce an outlet stream.

2. The process of claim 1, further comprising directly coupling an outlet of the first stage reactor to an inlet of the second stage reactor.

3. The process of claim 1, wherein the first oxidizing gas and the second oxidizing gas are both at least partially comprised of gaseous oxygen.

4. The process of claim 1, wherein a flow direction of the second oxidizing gas is tangential to a center axis of the second stage reactor to impart a rotating force within the second stage reactor to generate the reverse vortex flow.

5. The process of claim 1, wherein the reverse vortex flow is configured to provide for an insulating zone between a reaction zone located near a center axis of the second stage reactor and an inner surface of the second stage reactor.

6. The process of claim 1, wherein the reverse vortex flow is configured to provide for a recirculation zone between a reaction zone located near a center axis of the second stage reactor and an inner surface of the second stage reactor.

7. The process of claim 1, wherein the first stage reactor is further configured to have a reverse vortex flow motion within the first stage reactor.

8. The process of claim 1, wherein the outlet stream comprises hydrogen and carbon monoxide.

9. The process of claim 8, wherein the outlet stream further comprises light hydrocarbons such as methane, acetylene, ethylene and ethane.

10. The process of claim 1, wherein the non-equilibrium plasma in the first stage reactor is generated by applying high voltage potential between a first electrode of the first stage reactor and a second electrode of the first stage reactor.

11. The process of claim 1, wherein the hydrocarbon fuel is liquid, gaseous or solid hydrocarbon fuel.

12. The process of claim 11, wherein the solid hydrocarbon fuel is biomass.

13. The process of claim 11, wherein the liquid hydrocarbon fuel is gasoline, diesel or jet propellant.

14. The process of claim 13, wherein the jet propellant is JP8 or JP5 fuel.

* * * * *